(12) United States Patent
Fiebig et al.

(10) Patent No.: US 9,354,865 B2
(45) Date of Patent: May 31, 2016

(54) SYSTEM AND METHOD FOR CONTROLLING THE DEVELOPMENT OF A SOFTWARE APPLICATION

(71) Applicant: Software AG, Darmstadt (DE)

(72) Inventors: Thorsten Fiebig, Mannheim (DE);
Daniel Adelhardt, Bockhorn (DE);
Gary Woods, Seeheim (GB)

(73) Assignee: SOFTWARE AG, Darmstadt (DE)

( * ) Notice: Subject to any disclaimer, the term of this patent is extended or adjusted under 35 U.S.C. 154(b) by 147 days.

(21) Appl. No.: 13/790,383

(22) Filed: Mar. 8, 2013

(65) Prior Publication Data
US 2013/0219361 A1    Aug. 22, 2013

(30) Foreign Application Priority Data

Feb. 18, 2013    (EP) .................... 13155628

(51) Int. Cl.
*G06F 9/44*    (2006.01)
(52) U.S. Cl.
CPC .. *G06F 8/70* (2013.01); *G06F 8/30* (2013.01); *G06F 8/35* (2013.01); *G06F 9/44* (2013.01)
(58) Field of Classification Search
CPC ............... G06F 8/70; G06F 8/36; G06F 8/35; G06G 9/44
See application file for complete search history.

(56) References Cited

U.S. PATENT DOCUMENTS

| | | | |
|---|---|---|---|
| 8,037,453 B1 | 10/2011 | Zawadzki | |
| 8,132,153 B2 | 3/2012 | Subramanyam | |
| 8,140,477 B2 | 3/2012 | Moore et al. | |
| 8,140,894 B2 * | 3/2012 | Thomson et al. | ................ 714/15 |
| 8,225,308 B2 | 7/2012 | Sedukhin et al. | |
| 8,285,678 B2 | 10/2012 | Moore et al. | |
| 2003/0093769 A1 * | 5/2003 | Kumar | ............................ 717/108 |
| 2003/0237027 A1 * | 12/2003 | Cook | ............................. 714/38 |
| 2005/0108680 A1 * | 5/2005 | Cheng et al. | ................... 717/104 |
| 2005/0144226 A1 * | 6/2005 | Purewal | ........................ 709/203 |

(Continued)

FOREIGN PATENT DOCUMENTS

EP    1 898 345    3/2008

OTHER PUBLICATIONS

D. E. Cox et al., "Management of the serviceoriented-architecture life cycle", [Online], IBM Systems Journal, vol. 44, No. 4, 2005, pp. 709-726, [Retrieved from Internet on Jul. 7, 2014], <http://ieeexplore.ieee.org/stamp/stamp.jsp?tp=&arnumber=5386697>.*

(Continued)

*Primary Examiner* — Thuy Dao
*Assistant Examiner* — Ziaul A Chowdhury
(74) *Attorney, Agent, or Firm* — Nixon & Vanderhye PC

(57) ABSTRACT

Certain example embodiments relate to techniques for controlling the development of a software application. The system includes an event channel for receiving at least one event that indicates an action performed by one of a plurality of existing development tools used in the development of the software application, a policy-based event engine for evaluating the at least one event and for initiating at least one action of one of the plurality of existing development tools in accordance with at least one policy, and a repository, for storing at least one artifact to define an architecture of the software application. The at least one artifact corresponds to a component of the software application and/or to a dependency between a first component and a second component of the software application.

17 Claims, 1 Drawing Sheet

(56) References Cited

U.S. PATENT DOCUMENTS

Figure 1:
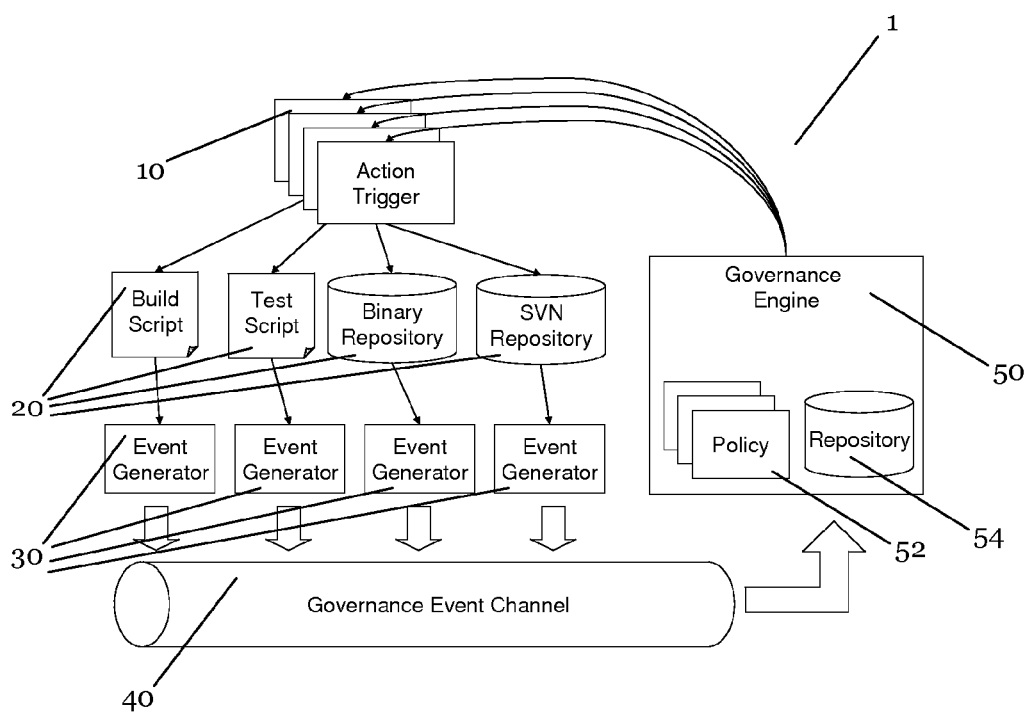

| | | | |
|---|---|---|---|
| 2006/0143219 | A1 | 6/2006 | Smith et al. |
| 2008/0066049 | A1* | 3/2008 | Jain et al. .................. 717/101 |
| 2008/0229276 | A1* | 9/2008 | Koehler et al. ............. 717/104 |
| 2009/0024561 | A1* | 1/2009 | Palanisamy .................. 707/1 |
| 2009/0083268 | A1 | 3/2009 | Coqueret et al. |
| 2009/0106729 | A1* | 4/2009 | Adi et al. .................... 717/101 |
| 2009/0300577 | A1* | 12/2009 | Bernardini et al. .......... 717/101 |
| 2010/0095266 | A1* | 4/2010 | Novak ........................ 717/101 |
| 2010/0324952 | A1 | 12/2010 | Bastos et al. |
| 2011/0022439 | A1* | 1/2011 | Arni et al. .................... 705/9 |
| 2011/0031443 | A1 | 2/2011 | Park |
| 2012/0011077 | A1 | 1/2012 | Bhagat |
| 2012/0110030 | A1* | 5/2012 | Pomponio .................... 707/805 |
| 2013/0073614 | A1* | 3/2013 | Shine et al. .................. 709/203 |
| 2013/0152106 | A1* | 6/2013 | Arni et al. .................... 719/318 |
| 2013/0239095 | A1* | 9/2013 | Brown ........................ 717/128 |

OTHER PUBLICATIONS

Raymond Paul et al. "Architecture Classification for SOA-Based Applications", [Online], 2006 IEEE, pp. 1-8, [Retrieved from Internet on Jul. 7, 2014], <http://pmlab.iecs.fcu.edu.tw/PP/Papers/SM/TFCP06.pdf>.*

Yinsheng Li et al., "Multi-model driven collaborative development platform for service-oriented e-Business systems", [Online], Sep. 2007, pp. 328-339, [Retrieved from Internet on Jul. 7, 2014], <http://ac.els-cdn.com/S1474034607000699/1-s2.0-S1474034607000699-main.pdf>.*

Borko Furht, "Cloud Computing Fundamentals" [Online], Springer 2010, pp. 3-19, [Retrieved from Internet on Jul. 9, 2014], <http://download.springer.com/static/pdf/269/chp%253A10.1007%252F978-1-4419-6524-0_1.pdf>.*

Charles B. Haley et al. "A Framework for Security Requirements Engineering", [Online], 2006, pp. 35-41, [Retrieved from Internet on Apr. 12, 2015], <http://oro.open.ac.uk/2484/1/Haley-SESS06-p35.pdf>.*

Andre van der Hoek, et al., "Software Release Management", [Online], 1997, pp. 159-175, [Retrieved from Internet on Apr. 12, 2015], <http://delivery.acm.org/10.1145/270000/267909/p159-hoek.pdf>.*

Walt Scacchi, "Free/Open Source Software Development : Recent Research Results and Emerging Opportunit ies", [Online], 2007, pp. 1-10, [Retrieved from Internet on Apr. 12, 2015], <http://citeseerx.ist.psu.edu/viewdoc/download?doi=10.1.1.129.2442&rep=rep1&type=pdf>.*

Paul Grünbacher et al., "Reconciling Software Requirements and Architectures: The CBSP Approach", [Online], 2001, pp. 202-211, [Retrieved from Interneton Apr. 12, 2015], <http://ieeexplore.ieee.org/stamp/stamp.jsp?tp=&arnumber=948560>.*

John Grundy et al., "Coordinating Distributed Software Development Projects with Integrated Process Modelling and Enactment Environments," 1998 Proceedings of the 7$^{th}$ Workshop on Enabling Technologies: Infrastructure for Collaborative Enterprises (WETICE), Jun. 17, 1998, pp. 39-44.

Wikipedia, "Integrated Development Environment", 4 pages, printed on Mar. 8, 2013.

Wikipedia, "SOA Governance", 3 pages, printed on Mar. 8, 2013.

Wiki-jenkins-ci.org, "Meet Jenkins", 4 pages, printed on Mar. 8, 2013.

Wiki-eclipse-org, Meet Hudson, 4 pages, printed on Mar. 8, 2013.

Fowler, Martin, Continuous Integration, 14 pages, printed on Mar. 8, 2013.

Sonatype, "About Sonatype", 2 pages, printed on Mar. 8, 2013.

Jfrog, "Meet Artifactory", 2 pages, printed on Mar. 8, 2013.

Togaf, "Architecture Forum", 2 pages, printed on Mar. 8, 2013.

About Layer7 Technologies, Secure & Manage API-Based integrations Span SOA, Mobile, Web & Cloud, 2 pages, printed on Mar. 8, 2013.

Franchise Technologies, Inc., "Progress Open Edge", 2 pages, printed on Mar. 8, 2013.

Centrasite, "Free Download Center", 1 page, printed on Mar. 8, 2013.

HP SOA Systinet Software, 9 pages, printed on Mar. 8, 2013.

IBM Redbooks, "Integrating WSRR with WebSphere DataPower", 2 pages, printed on Mar. 8, 2013.

Wikipedia, "SOA Policy Governance—Uniform Policy Management", 2 pages, printed on Mar. 8, 2013.

Oracle, Enterprise Repository, 2 pages, printed on Mar. 8, 2013.

Wikipedia, "Event-drive architecture", 6 pages, printed on Mar. 8, 2013.

* cited by examiner

SYSTEM AND METHOD FOR CONTROLLING THE DEVELOPMENT OF A SOFTWARE APPLICATION

This application claims priority to EP Application No. 13 155 628.4, filed Feb. 18, 2013, the entire contents of which is hereby incorporated by reference.

1. TECHNICAL FIELD

Certain example embodiments relate to a system for controlling the development of a software application and to a corresponding method.

2. BACKGROUND AND SUMMARY

The development of modern software applications has become a complex challenge. This is because modern software applications are typically comprised of a multitude of distinct software components each performing a certain piece of functionality of the overall software application. Accordingly, all software components of a software application have to work together in a consistent manner to execute a pre-defined "process", which is to be understood as a series of steps to be executed in a specific sequence in order to achieve an overall computing task.

Examples of such complex software applications include applications for controlling an assembly line e.g. for the manufacturing of vehicles, the controlling of the tasks to be performed by individual computing systems in a flight control system, or the calculation of vast amounts of data for scientific purposes, such as weather forecasts or complex simulations. Another example of such software applications are business applications. Business applications are focused on the automatic controlling and orchestrating of individual computing systems that perform a task of an enterprise (so-called "business process"). Although the overall task to be achieved may be a business-oriented task, it is noted that the technical implementation of the underlying software application is typically extremely complex, since it typically spans numerous software application components distributed among the enterprise's information technology infrastructure.

Such components of a (business) software application may comprise e.g. implementation components (home grown code, i.e. self-developed components) and/or third-party components (i.e. components that are obtained from a third-party, such as open source components, software libraries, or the like). Apparently, a typical complex software application is comprised of a variety of implementation components and third-party components, which have to be properly combined. Even more complexity is added by using e.g. Web services that are running in external environments such as the public cloud. In addition, all these components may come with different versions.

In such a complex development scenario, so-called "implementation governance" becomes a key factor to minimize both technical and legal risks. For example, when introducing third-party components into a software application under development, their licensing needs to be verified and the usage of chargeable third-party needs to be done in a controlled way to keep costs under control. Also so-called "security compliance" is an aspect relevant for third-party components as well as for self-developed components. Further, the development process itself needs to be governed, i.e. it must be controlled that the development process moves forward in a well-defined manner. For example, source code changes should only be committed to a central repository unless nightly builds and build verification tests are successful. In staged integration testing environments, certain tests have to be passed before components can enter the next stage.

To control the above-mentioned and other technical risks, the implementation of the software application needs to follow a pre-specified architecture, i.e. it has to be ensured that the (evolving) implementation of the software application only comprises specified components and specified dependencies between these components. Finally, also the lifecycle of the components needs to be governed, which also needs to cover the deprecation of components and their sun-setting. Yet another challenge is that the architecture of a (business) application typically evolves through the implementation, i.e. the architecture may change during the development of the software application. To ensure that the implementation does not violate any compliance rules, the governance thus needs to be carried out continuously, i.e. in a timely fashion, and needs to be flexible enough to cope with architectural changes.

Furthermore, complex software applications are typically developed and implemented by a huge number of software developers. In general, Integrated Development Environments (IDE) (http://en.wikipedia.org/wiki/Integrated_development_environment) are known that provide a framework of IDE tools for the development of software applications. A common IDE for the programming language Java is for example Eclipse. An IDE typically comprises besides basic IDE tools for build automation and debugging additionally a central source repository. The central IDE repository comprises the source code on which the software developers work. The source code is typically committed as implementation components in the source repository and deployed to the other developers. In the development of software applications and increasing complexity a huge number of developers work on the development of one common application and the source code thereof.

Those skilled in the art will appreciate that controlling the development of a complex software application is a difficult task, while severe technical problems can arise already if one single commitment of an implementation component in the source repository of a developer fails (e.g. a failure in build automation) and the incorrect source code is already deployed to the other developers, or even to the final product, before detection of the failure. This way, the source code of the entire software application might be affected by failures and consequently also the deployed software application built from the erroneous source code. For example, consider a software application of a process that operates an assembly line (as mentioned before) e.g. for the manufacturing of vehicles. An incorrect implementation of the software application could lead to a complete halt of the assembly line or even to damages to the produced vehicles.

"Service-oriented architecture (SOA) governance" (cf. e.g. http://en.wikipedia.org/wiki/SOA_governance) is an approach for controlling correct operations in a SOA, including among others ensuring that all SOA components interact properly in terms of communication patterns, security rules, response times and/or other performance characteristics (quality of services), ensuring that changing a service does not impose unforeseen consequences on service consumers (change management) and/or ensuring that services evolve within the system only in a controlled manner (lifecycle management). An exemplary application of general SOA governance with a SOA registry, namely "Governance Service Registry" and a "Process Engine" comprising a "Governance Approval Process" is disclosed in US patent application 2011/0314439 A1. Further lifecycle management is addressed in this document. Explicitly, a change of a lifecycle state of a software object is detected in the SOA registry. A "Governance Lifecycle" process for the object is implemented afterwards, in the SOA registry. This task of the implementation is achieved in transmitting an approval process input to the "Process Engine". Further examples for the general use of registries and depositories can be found in the disclosures of US patent application no. 2009/0083268 A1 and U.S. Pat. No. 8,132,153 B2.

Contrary to SOA governance and the use of registries, US patent application no. 2010/0324952 A1 discloses an approach for continuously managing Governance, Risk and Compliance (GRC) within an integrated framework. The framework comprises an "Organization Inventory" and "Organization Risks" layer. The "Organization Inventory" layer comprises elements such as business components, system and applications and assets. Importantly, each asset in the "Organization Inventory" layer comprises a control with a respective linkage to a risk in the "Organization Risks" layer. A risk level is periodically measured based on a risk index, determined for each control in this disclosure. Further the GRC approach e.g. via the use of a GRC engine can be integrated into Cloud Computing (via integration layers) for improved governance efficiency (cf. related US Patent application no. 2012/0011077 A1).

However, while the above-discussed prior art approaches allow for continuous SOA governance, i.e. the controlling of the correct operation of an already developed SOA system, the proposed prior art systems lack a reliable and efficient way of controlling the development of software applications in the first place. In a further aspect, the known approaches do not address the problems of integrating a vast variety of different development tools into an overall development process, controlling that the individual components of the software application are properly integrated in a timely fashion ("continuous integration"), and controlling that the individual components of the software application conform to a pre-defined software architecture ("architecture governance").

It is therefore the technical problem underlying certain example embodiments to provide an approach for controlling the developing implementation of a complex software application in a continuous way and to ensure that the software application conforms to a pre-defined architecture, so that failures in the developing application are recognized in early stages, thereby at least partly overcoming the above explained disadvantages of the prior art. In a further aspect, certain example embodiments aim at providing an approach to easily integrate a wide variety of existing development tools, so that these tools consistently work together in the overall development of a software application.

This problem is according to one aspect solved by a system for controlling the development of a software application. In the embodiment of claim 1, the system comprises:

a. an event channel, adapted for receiving at least one event that indicates an action performed by one of a plurality of existing development tools used in the development of the software application;
 b. a policy-based event engine, adapted for evaluating the at least one event and for initiating at least one action of one of the plurality of development tools in accordance with at least one policy; and
 c. a repository, adapted for storing at least one artifact to define an architecture of the software application, wherein the at least one artifact corresponds to a component of the software application and/or to a dependency between a first component and a second component of the software application.

Accordingly, the embodiment defines a comprehensive control system for enabling a proper, reliable, timely and architecture-conformant control over the development of software applications. As mentioned before, nowadays complex software applications (such as business applications) are implemented by a plurality of software developers which typically use a vast variety of different development tools for the individual tasks of the overall development process. The software architecture shows similar complexity and is defined by software/implementation components that are related to each other via dependencies. The implementation components and dependencies therebetween have to be controlled in a continuous way for the early detection of policy violations, such as violations of the specified architecture.

Importantly, certain example embodiments propose an event-driven system comprising an event bus and a policy-based event engine exercising centralized control over the development of software applications. Explicitly, all activities that are triggered by the development tools are observed in the event channel and fed into the policy-based event engine. As one important advantage over the prior art, the event-driven approach allows for the addressed timely detection of anything going on in the development tools, comprising the detection of failures or policy violations in the very beginning. Furthermore, the policy-based event engine of certain example embodiments is not only capable of analyzing events triggered by the development tools, but also capable of triggering certain actions of the same or a different development tool in response, which results in a comprehensive control of the existing development tool chain. Certain example embodiments further provide an easy integration of any type of existing development tool, since the tool simply has to be "hooked" into the event bus.

The above-described system further comprises a repository which is adapted for storing at least one artifact to define an architecture of the software application, wherein the at least one artifact corresponds to a component of the software application and/or to a dependency between a first component and a second component of the software application. Accordingly, providing a repository in which the desired architecture of the software application to be developed is defined allows for a reliable evaluation whether the actual implementation of said software application (as it is performed by means of the development tools) actually conforms to the desired architecture.

In the following a plurality of scenarios related to failures in the development of software applications are briefly addressed to provide explicit examples and to underline the importance of the above-mentioned advantages.

Considering two components of a software application with an invalid dependency, it has to be ensured that this dependency is detected early on to avoid an inclusion or commitment of this incorrect dependency on the source code level. Besides software architecture, developmental processes, such as build automation, code repository management and automated deployment have to be considered in software applications. Considering further the build automation, e.g. the source repository should be closed whenever there is a build problem. Hence the commitment and deployment of an undesired or error-prone component or dependency can be prevented.

The development of the implementation is controlled automatically and continuously with the policy-based event engine of certain example embodiments to avoid the addressed failures and to allow for early detection of problems. This policy-based event engine is importantly adapted for evaluating at least one event in accordance with at least one policy, and further adapted for initiating at least one action of the development tool referenced by the event.

For example, the policy-based event engine might relate to the control of the detection of a new software component. The event ("Detection") received via the event channel is evaluated in the policy-based event engine. One exemplary policy for such evaluation ("architecture compliance check", i.e. "is the component conformant with the architecture") is related to the verification whether the software component is in accordance with the software architecture defined by the repository's artifacts. Depending on the result of the evaluation of the policy, an appropriate action may be triggered. For example, the new component is approved if its conformance with the architecture is confirmed. In the other case, i.e. if it is evaluated that the new component does not conform to the architecture, the new component is rejected and certain actions are triggered to assure that the violation can be fixed (e.g. the source repository relating to the component in question can be closed, or an alert message, such as an email, can be sent to a developer who is in charge of the component).

In a further aspect, the policy-based event engine is further adapted for initiating at least one action of the development tool indicated by the event and/or one of the plurality of development tools which is different from the development tool indicated by the event. Accordingly, certain example embodiments allow not only to trigger a certain action of the particular development tool which issued an event itself, but also additionally or alternatively to trigger another one of the various development tools. In particular according to the latter aspect, the present system is thus capable of controlling the entire development tool chain involved in an arbitrarily complex development process.

For example, the plurality of development tools may be selected from the group comprising a build script, a test script, a binary repository and/or a source code repository, and the at least one action may be selected from the group comprising a test procedure, a build process, a deployment process, closing a binary repository and/or closing a source code repository. Accordingly, development tools may include IDE tools, providing various aspects of software application development (such as software architecture and/or build automation). The execution of a development tool results in an according action. In general it is plausible that not just the development tool referenced by the event is executed, but other tools as well. Typically software components run through a "lifecycle" with distinct developmental stages. Considering the example of new implementation components, mentioned further above, in a first stage a new integration component is detected and the IDE tool (build script) with the action (build process) is triggered. This action might cause the creation of a new software component and deployment in the source code after successful build. The implementation component enters the approved stage.

As already indicated above, the at least one component of the software application may be selected from the group comprising an implementation component (i.e. a self-developed component, such as "home grown" code) and/or a third-party component (i.e. a component obtained from a third party, such as open source components, binary components, software libraries, or the like).

In yet one further aspect, the at least one event reflects that a new component and/or dependency was added to the software application, and wherein the policy-based event engine is adapted for determining whether the repository comprises an artifact that corresponds to the new component and/or dependency. Accordingly, it can be easily checked whether a component, which was newly added to the software application by one of the development tools, was actually planned, i.e. whether it conforms to the architecture of the application. If it was planned, the repository already comprises a corresponding artifact.

In one further aspect, if it is determined that the repository does not comprise an artifact that corresponds to the new component and/or dependency, the policy-based event engine is adapted for creating a new respective artifact and for initiating an approval workflow. Accordingly, if no corresponding artifact is present in the repository for the newly added component or dependency, the addition of the component or dependency does not have to be forbidden altogether, but an approval process can be started in order to determine whether the newly added component or dependency should be kept in the software application.

In one further aspect, if the approval workflow results in the new artifact being rejected, the policy-based event engine is adapted for initiating an action of an existing development tool to remove the corresponding component and/or dependency. Accordingly, if it turns out that the newly added component/dependency did not pass the approval workflow, certain example embodiments reliably ensure that the undesired component/dependency is, preferably immediately, removed from the software application. This way, it is ensured that the software application stays free of erroneous aspects in a timely fashion.

In one further aspect, the at least one event reflects that a third-party component was added to the software application, and wherein the policy-based event engine is adapted for determining, by means of the at least one policy, whether the third-party component is compliant with the at least one policy. This includes e.g. the evaluation whether the third-party component is properly licensed or whether the third-party component introduces a security vulnerability. Accordingly, it can be efficiently and reliably controlled that only proper code is integrated into the software application to be developed at any time. Also, new policies can be added to the system of certain example embodiments to dynamically to cope e.g. with new acceptance tests, etc. for third-party products.

As it is apparent from the above, the repository of certain example embodiments provides a further central system component of the policy-based event engine comprising artifacts that define the intended architecture of the software application. An artifact may represent different types of components and/or their dependencies. For example, jar files, Java packages or Java sources and/or third party jars and/or third party products can be considered as types. Further, artifacts can have different lifecycle states. Artifacts typically comprise information such as a name and/or type to uniquely identify a component in the repository.

In yet another aspect, the system further comprises at least one event generator for a corresponding existing development tool, wherein the at least one event generator is adapted for creating the at least one event and for sending the at least one event to the event channel when the corresponding existing development tool performs an action. Accordingly, the system of certain example embodiments can be extended with at least one event generator, integrated as an interface between the at least one development tool and the governance event channel. The event generators are responsible for the generation of events and/or sending events to the governance event channel, thereby allowing an easy and reliable integration of existing development tools into the system of certain example embodiments.

In one aspect, the at least one event generator provides a function that is callable by the corresponding development tool to create the at least one event. Accordingly, the event generator might offer a so-called API (application programming interface) into which the corresponding development tool can hook itself in order to be integrated into the overall control system.

Additionally or alternatively, the at least one event generator is adapted for scanning a state of the corresponding development tool to create the at least one event. Accordingly, in this aspect the development tool is passively integrated into the overall control system without having to be adapted at all.

In another aspect, the at least one event is an XML-based event, which allows for a particularly easy and flexible definition of the contents of the events communicated within the system of the present invention.

Certain example embodiments are also directed to a method for controlling the development of a software application using any of the above-disclosed systems.

Furthermore, certain example embodiments also provide a computer program comprising instructions for implementing the above-described method.

3. BRIEF DESCRIPTION OF THE DRAWINGS

In the following detailed description, presently preferred embodiments are further described with reference to the following figures:

FIG. 1: A schematic representation of a system for controlling the development of a software application with a policy-based event engine as central control component in accordance with one embodiment; and FIG. 2: An exemplary life cycle for new implementation components comprising different life cycle states in accordance with one embodiment.

4. DETAILED DESCRIPTION

In the following, a presently preferred embodiment is described with respect to a system 1 for controlling the development of a software application schematically shown in FIG. 1. As can be seen, certain example embodiments propose a system 1 with a central policy-based event engine 50 (hereinafter also interchangeably referred to as "Governance engine") and an event driven approach allowing for an easy integration of existing development tool (such as IDE tool) chains 20 into the event-based control system 1.

As illustrated in FIG. 1, the different IDE tools 20 like build scripts, binary repository and source repository are talking to event generators 30. The event generators 30 are creating events and send those events to the governance event channel 40 (also referred to as "event channel"). The generated event stream is consumed, i.e. received, by the governance engine 50. The governance engine 50 has the capability of evaluating policies 52 on the event stream. Note that, as already mentioned further above, policies 52 may be provided that operate on a single event, on a continuous stream of incoming events (i.e. on a series of events arriving at a constant frequency), or even on a stream of discrete events arriving sporadically on the event channel. Accordingly, certain policies may fire when a single event of interest is detected, when a certain threshold of multiple events occurs within a certain period of time, or when a certain pattern is detected within the stream of events. Additionally, the policies 52 can look up information from the governance engine 50 repository 54. The governance engine 50 policies 52 can in turn trigger arbitrary actions affecting the integrated IDE tools 20. For example, the policies 52 can initiate a build process or can trigger the closing of a source repository. Although the policies 52 are shown in FIG. 1 as distinct entities from the repository 54, the policies 52 may also be stored and managed within the repository 54. The set of policies 52 can be extended.

Besides these policies 52, in one preferred embodiment the repository 54 stores the artifacts of the software architecture of the software application, which is meta-data for the software components and the dependencies between them. The component artifacts can represent all kinds of software components comprising single $3^{rd}$ party jars and/or $3^{rd}$ party products. Also source components like Java packages or source files can be represented via component artifacts. The component artifacts might carry the information to uniquely identify a component in the source or binary repositories. As one example, dependency artifacts can be identified based on the components and/or the dependency type.

Preferably, the repository 54 has a classification system to add more semantics to the artifacts. Classifications can be used to distinguish between different types of component artifacts or dependencies. As one example, artifacts may be classified based on one or more taxonomies managed in the repository. For example, the different types of components may be managed in a taxonomy and the repository may allow to define arbitrary taxonomies that are needed to represent the semantics/purpose of a component/artifact.

Further, in another embodiment artifacts can have different versions and/or different lifecycle states. The lifecycle management capabilities comprise the definition of lifecycle states and/or lifecycle stages (i.e. groups of lifecycle states), which is important to model a stage development scenario. Policies 52 can be attached to state transitions to ensure certain consistency constraints. Since the policies 52 of the governance engine 50 can trigger arbitrary actions, approval workflows can be initiated on a state change. Concerning this aspect of lifecycle management, the system of certain example embodiments may generally provide functionalities as disclosed in European patent No. 1 898 345 B1 of applicant titled "system for managing the lifecycle of a service oriented architecture".

The set of component artifacts is exemplary defined based on the architecture of the business application. The component set can be updated to cope with architectural changes. Changes of the component set are governed (also referred to as controlled) via policies 52. An example for a common policy 52 rejects the introduction of new $3^{rd}$ party components that have not passed the necessary licensing checks. Other policies 52 can be more specific to the business application. In a preferred embodiment there could be policies 52 to ensure that certain components are not directly referenced but only through a certain interface.

In one preferred embodiment, on the governance event channel 40 there are process related events like those indicating a new successful build or a failing tests. Other events are indicating component or dependency updates. These events are for example relevant for the architecture continuous governance or control. If there is an event indicating the creation of a new component policies 52 are checking the validity of the newly detected component. First, the check if there is an artifact in the repository matching the new component. If this is the case the new component is a valid part of the architecture. If not, a new artifact is created that runs through a configurable lifecycle to become part of the approved architecture. An exemplary (simple) governance lifecycle is shown in FIG. 2.

Figure 2:
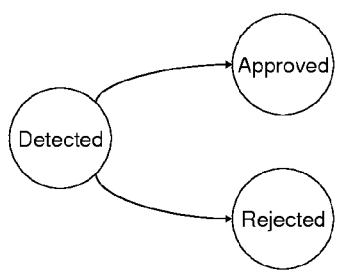

As indicated in FIG. 2, when a new component is detected, an according event "NewComponent" is sent on the event channel 40. The policies 52 processing this event create a new artifact in the repository 54 and verify the aspects described herein. If the policies or the approval are failing, the artifact is moved to the lifecycle state "Rejected". Otherwise, it is moved to the lifecycle "Approved", which indicates that the artifact is valid and that the corresponding component is allowed to be part of the software application. These lifecycle state changes may also result again in events, but in the simple case this is not necessary. Updates and/or deletions of components may be handled accordingly. This means if an event is detected indicating a component update or deletion, its artifact in the repository 54 is processed accordingly.

Dependency artifacts can be processed in a similar way in one aspect of certain example embodiments. If there is an event indicating a new dependency it is checked if there is already a corresponding artifact in the repository 54. If not, a new one is created and moved through a governance lifecycle. Corresponding to the component lifecycle the dependency lifecycle is configurable. The state transitions of the dependency lifecycle can have attached policies 52 including polices 52 triggering an approval process. If a dependency artifact reaches an "Approved" state it is added to the architecture. If it reaches a "Rejected" state, actions are triggered to remove the dependency from the implementation. Dependency updates and/or deletions are preferably processed accordingly.

Preferred Implementation

The implementation of an exemplary embodiment preferably comprises:

Governance event channel 40 and event generators 30

Governance engine 50 including governance policies 52 and repository 54

Action triggers 10

The implementation of IDE tools 20 is not in scope of certain example embodiments, rather the integration of the continuous control into existing IDE tools 20 as one aspect of certain example embodiments.

Governance Event Channel

The governance event channel 40 can be preferably implemented with enterprise service bus (ESB) technology or with the Apache Camel enterprise integration framework. The Apache Camel framework supports content based routing of messages. Apache Camel offers multiple transport methods that can be leveraged for sending messages holding governance events.

According to the event driven architecture paradigm the event messages preferably comprise a header and/or a body. The header comprises the event type. The event type helps to distinguish different types of governance events. For example the events indicating changes of the component or their dependencies have a dedicated type to distinguish them from development process events. This distinction makes it easier to route the events to the dedicated policies 52 and to process them within the governance event stream. The event body holds the event payload which is dependent on the event type. The following sample shows a simplified XML event message that indicates a build error.

```
<event>
    <header>
        <type>BuildFailure</type>
    </header>
    <body>
        <build-number>6798</build-number>
        <build-results>
            http://host:8080/job/INMJ_trunk_continuous/6798/
```

-continued

```
            console
        </build-results>
    </body>
</event>
```

The header of the event comprises as one example the event type and the body provides details about the build failure like the build number and a link to obtain the detailed build results.

Architecture related events preferably hold the details about the affected components and their dependencies. The following message shows an example for an event indicating a new dependency.

```
<event>
    <header>
        <type>NewDependency</type>
    </header>
    <body>
        <dependency>
            <source type="jar">
            http://host:8080/binary-repository/notification.jar
            </source>
            <target type="jar">
            http://host:8080/binary-repository/mail.jar
            </target>
        </dependency>
    </body>
</event>
```

An exemplary and simplified XML message shows the event header with the event type and the body that holds the information about the source and the target of the dependency. Source and target of the dependency are identified via URLs pointing to the binary repository. The new dependency is detected between a home grown jar and $3^{rd}$ party jar file.

Dependencies between Java packages can be represented correspondingly. The following sample shows an event indicating a new dependency between two Java packages.

```
<event>
    <header>
        <type>New Dependency</type>
    </header>
    <body>
        <dependency>
            <source type="java-package">
            com.example.notification
            </source>
            <target type="java-package">
            javax.mail.internet
            </target>
        </dependency>
    </body>
</event>
```

Event Generators

In one preferred embodiment, the IDE tools 20 do not directly create event messages that can be sent through the governance event channel 40. This gap can be bridged by the event generators 30. Several types of event generators 30 are needed to deal with the different types of IDE tools 20 and their capabilities. Some of them already support the creation of events that just need to be translated into the event messaging format of the governance event channel 40.

The following sample shows the pseudo code of a function that can be called by a script that is triggered by the source repository on a commit of a source file change.

```
void extract-new-dependency(File changedFile)
{
        Package sourcePackage = changedFile.getPackage( );
        Collection changedLines = changedFile.getChangedLines( );
        foreach(Package targetPackage in extractImport(changedLines))
        {
                Event event = new
NewDependencyEvent(sourcePackage,targetPackage);
                GovernanceEventChannel.sendEvent(event);
        }
}
```

Preferably, the input of the function is a File object holding the changed file including all the changed source lines. From these changed lines the function extracts the Java imports. For each detected import it creates a "NewDependency" event and submits it to the governance event channel 40.

Other IDE tools 20 are harder to integrate, since their state needs to be scanned to determine if a certain event has happened. This kind of integration problem can be solved by applying the well-known enterprise integration patterns. The Apache Camel framework offers a comprehensive implementation for the enterprise integration patterns which makes it a good candidate for implementing the governance event channel and the event generators 30.

Governance Engine

In a preferred embodiment, the core components of the governance engine 50 are the repository 52 and the policy engine that supports the execution of polices 52 on the governance event channel 40 and on the repository 54 content.

Repository

The repository 54 preferably manages the artifacts for representing software components and their dependencies. The repository 54 can comprise various kinds of artifacts including those representing jar files, Java packages or Java sources. The following sample shows the simplified XML representation of an artifact representing a Java package.

```
<artifact>
        <name>Notification package</name>
        <type>java-package</type>
        <uri>com.exorg.artifacts/java-package/com-example-
        notifcation</uri>
        <component>com.example.notification</component>
        <lifecycle-state>approved</lifecycle-state>
</artifact>
```

Exemplary, the artifact has a display name that can be internationalized. The artifact type distinguishes between the different kinds of artifacts. Here the powerful classification mechanism of the repository 54 can be applied. The classifications are done based on taxonomies that are also stored in the repository 54.

For example, the artifact's URI is the unique identifier. The represented software component is referenced via the component element. Artifacts can be versioned and assigned to a state of lifecycle that is also maintained in the repository 54. In this example, the lifecycle state is "approved".

The governance engine 50 repository 54 provides powerful query capabilities to retrieve the artifacts for a given software component or vice versa.

The artifacts can have dependencies. The following XML fragment shows an import dependency between two Java package artifacts.

```
<dependency>
        <source>com.exorg.artifacts/java-package/com-example-
        notifcation</source>
        <target>com.exorg.artifacts/java-package/com-example-
        mail</target>
        <type>import</type>
</dependency>
```

Preferably, the source element comprises the URI of the artifact representing the dependency source. The target element points to the target artifact. The dependency type classifies the dependency as an import dependency. The dependency classifications are done based on the taxonomies stored in the repository 54.

Besides import dependencies also containment dependencies can be represented. The following dependency shows that the notification package belongs to the notification jar.

```
<dependency>
        <source>com.exorg.artifacts/jar/notifcation</source>
        <target>com.exorg.artifacts/java-package/com-example-
        notifcation</target>
        <type>contain</type>
</dependency>
```

The query capabilities of the repository 54 allow to efficiently retrieving dependencies pointing to an artifact as one example.

Repository Policies

In one aspect, to govern or control the content of the repository 54 it supports policies 52. The policies 52 can be defined via a domain specific language (DSL) or a generic programming language like Java. The resulting flexibility allows to perform arbitrary checks and to trigger arbitrary actions via policies 52 including the start of a workflow process or starting build processes, tests or automatic deployments. The following sample shows pseudo code for a policy 52 ensuring that a package is only contained in a single jar.

```
PackageCheckPolicy
{
        boolean condition(Dependency newDep)
        {
                if(newDep.getSource( ).getType( ) != "jar") or
                newDep.getType( )
!= "contains")
                {
                        return false;
                }
                Collection deps=
Repository.getDendenciesByTarget(newDep.getTarget( ));
                foreach(Dependency dep in deps)
                {
                        if(dep.getSource( ).getType( ) == "jar" and
                        dep.getType( )
== "contains")
                        {
                                return true;
                        }
                }
                return false;
        }
        void action(Dependency newDep)
        {
                policy-validation(newDep);
        }
}
```

Exemplary, the sample policy 52 is fired whenever a new dependency is added to the repository 54. If the source of the new dependency is a jar artifact and the dependency has the type "contains", it checks if there is already a containment dependency in the repository 54 pointing to the same Java package. In this case the policy results in a policy 52 violation that rejects the new dependency to the repository 54.

Event Policies

In addition to policies 52 considering the repository 54 content polices are needed directly operating on the governance event channel 40 in one preferred embodiment. These policies 52 are executed by the policy engine 50 listening on the governance event channel. The policies 52 can be specified via a domain specific language (DSL) or generic programming language like Java. The policies 52 can execute arbitrary actions including storing new actions in the repository, triggering IDE tools or starting workflow processes. The following sample shows a policy reacting on a build error by locking the source repository 54.

```
BuildErrorPolicy
{
        boolean condition(Event event)
        {
                if(event.getType( ) == "BuildError")
                {
                        return true;
                }
                return false;
        }
        void action(Event event)
        {
                lockSourceRepository( );
        }
}
```

The policy 52 is triggered on an event on the governance event channel 40. If the event type indicates a build error the condition function returns true. The action of the policy 52 locks the source repository 54 via the according action trigger 10.

Triggering Actions

Preferably, the action triggers 10 invoked by the policies 52 interact with the IDE tools 20. Simple action triggers 10 just execute scripts for initiating builds or test executions. These kinds of operations can also be invoked by not directly starting a script but by interacting with a continuous integration (CI) server such as Jenkins (http://jenkins-ci.org/) or Hudson (http://hudson-ci.org/). Jenkins even supports the triggering of build jobs by sending HTTP request to a certain URL. More advanced actions are controlling the source and binary repositories.

The automatic deployment can be triggered via simple scripts or via dedicated deployment tools. The automated deployment supports single jars as well as complete images deployed to a cloud server.

Comparison to Prior Art Approaches

In the following, certain example embodiments are compared to conventional techniques:

Continuous Integration

The continuous integration (CI) is about organizing the implementation work of a team (http://martinfowler.com/articles/continuousIntegration.html). The idea is to integrate their work frequently to report problems as early as possible to the team members. The integration is verified by a build that is automatically tested. The CI key practices are:

Maintain a Single Source Repository.
 Automate the Build
 Make Your Build Self-Testing
 Everyone Commits To the Mainline Every Day
 Every Commit Should Build the Mainline on an Integration Machine
 Keep the Build Fast
 Test in a Clone of the Production Environment
 Make it Easy for Anyone to Get the Latest Executable
 Everyone can see what's happening
 Automate Deployment Several CI tools and products have been implemented for supporting the CI practices, comprising:

Hudson (http://hudson-ci.org/)
 Jenkins (http://jenkins-ci.org/)

Neither the CI approach nor the CI tools cover governance aspects like $3^{rd}$ party component management or a policy based architectural governance.

Binary Repositories

Binary repositories are also belonging to the CI enabling tools. Their purpose is to manage executables (binaries) and to share them across teams. The binary artifacts that can be managed include $3^{rd}$ party components as well as build results. The binary repository features also include dependency management and licensing checks. Example products and tools are:

Sonatype Nexus (http://www.sonatype.com/)
 Artifactory from JFrog (http://www.jfrog.com/home/v_artifactory_opensource_overview)

These products offer certain governance capabilities and can be easily integrated with other IDE tools. Nevertheless they do not provide advanced policy based governance capabilities. They also do not offer any event driven integration with IDE tools to enable continuous governance.

Continuous Delivery

Continuous delivery is another software development strategy for optimizing the deliver process of business applications. The products and tools in this area covering the automation of the whole development cycle including build, tests and deployment. Architectural governance is not covered.

Architecture/Implementation Governance

Architecture governance is an aspect of enterprise architecture as suggested by the architecture framework of the open group (http://www.opengroup.org/togaf/). It can be applied on single products as well as on the IT environment of a whole enterprise. The implementation governance makes sure that an implementation is compliant with the specified architecture. Performing continuous architecture governance via an event driven architecture is a new approach and not covered by the architecture framework of the open group.

SOA Governance

SOA governance (as already mentioned above) is a specific area of enterprise architecture. It is about keeping the control over the assets and artifacts of a SOA (Service Oriented Architecture). Several tools have been developed for supporting SOA governance. Closely related are the policy enforcement point products Layer? and Progress (http://www.layer7tech.com/, http://web.progress.com/) and the SOA registry/repository products CentraSite, Systinet, WSRR, SOA Software, and Oracle Enterprise Repository http://www.centrasite.com/, http://www8.hp.com/us/en/software/software-product.html?compURI=tcm:245-936884, http://www-01.ibm.com/software/integration/wsrr/#, http://www.soa.com/, http://www.oracle.com/technetwork/middleware/repository/overview/index.html) that can interact with policy enforcement points. Although these products offer certain capabilities that are necessary to implement continuous governance, they do not offer any event driven continuous governance approach. Moreover the supported governance does not cover the development process of modern business applications.

Event Driven Architecture

The event driven architecture (EDA) is an architectural paradigm that is based on event processing that allows to loosely couple software components (http://en.wikipedia.org/wiki/Event-driven_architecture). An event driven architecture consists of:

Event generators
Event channels
Event processing
Event driven actions

The EDA concept does not cover any governance related aspects, but provides the basis for the continuous governance approach disclosed by this embodiment.

Summary

The concept of certain example embodiments relates to a system, preferably for a (software) development system. But it can also be used wherever business processes are affected by ongoing changes (cycles) that need to be controlled as a whole. Software development (and software integration in general) comprises a lot of disjoint activities, like watching for changes in the source control system and/or checking the results of automated tests and/or integrate the latest used $3^{rd}$ party software and/or guarantee ongoing successful builds, etc. Guarding all of these steps, plus having a concept of the overall connection between them, is very hard to control manually. But since these are usually disjoint processes, integration is not easy. The state-of-the-art solution involves the usage of scripting and tedious synchronization across multiple platforms, which makes the architecture very vulnerable. Certain example embodiments propose a system, which has a "Governance Event Channel" and a "Governance Engine" (including a repository handling policies) as the active part to control and change the flow accordingly. All other components can use special clients (Event Generators) for communication.

Certain example embodiments hence propose an approach to merry an event bus and an active, policy-driven repository engine. All this has a minimal side-effect on the governed processes. New processes can be added seamlessly without increasing the complexity. In comparison to existing systems known from prior art, the proposed solution is more robust, flexible and scalable.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium. For instance, a SOA may include processing resources including, for example, one or more processors, a memory, disk or other transitory or non-transitory storage, etc., which may be configured to cooperate in executing a method of the type disclosed herein. The engines described herein may in certain example embodiments be controlled by and/or include processing resources such as, for example, at least one processor, a memory, transitory and/or non-transitory computer readable media, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method for controlling the development of a software application, the method comprising:

receiving from an event channel at least one event that indicates one or more actions performed by one of a plurality of existing development tools used in the development of the software application, at least one event reflecting that a new component and/or dependency between components of the software application was added to the software application;

evaluating with a policy-based event engine the at least one event and initiating with the policy-based event engine at least one action of one of the plurality of existing development tools indicated by the received event and in accordance with at least one policy;

storing in a repository a plurality of artifacts defining an architecture of the software application, wherein at least one artifact corresponds to a component of the software application and at least one artifact corresponds to a dependency between components of the software application, wherein artifacts stored in the repository include meta-data for the components and for dependencies between components of the software application;

determining with the policy-based event engine whether the repository comprises an artifact that corresponds to the new component and/or dependency reflected in the received event; and when it is determined that the repository does not comprise an artifact that corresponds to the new component and/or dependency, creating a new respective artifact corresponding to the newly added component and/or dependency for storage in the repository, initiating an approval workflow to determine whether the newly added component and/or dependency should be included in the software application, and setting an approval state for the new respective artifact based on a result of the approval workflow.

2. A system for controlling the development of a software application, wherein the system comprises:

at least one processor and a memory;

an event channel configured to receive at least one event that indicates one or more actions performed by one of a plurality of existing development tools used in the development of the software application, at least one event reflecting that a new component and/or dependency between components of the software application was added to the software application;

a policy-based event engine configured to evaluate the at least one event and initiate at least one action of one of the plurality of existing development tools indicated by the received event and in accordance with at least one policy; and a repository configured to store a plurality of artifacts defining an architecture of the software application, wherein at least one artifact corresponds to a component of the software application and at least one artifact corresponds to a dependency between components of the software application, wherein:

artifacts stored in the repository include meta-data for the components and for dependencies between components of the software application, the policy-based event engine is further configured to determine whether the repository comprises an artifact that corresponds to the new component and/or dependency reflected in the received event, and when it is determined that the repository does not comprise an artifact that corresponds to the new component and/or dependency, the policy-based event engine creates a new respective artifact corresponding to the newly added component and/or dependency for storage in the repository, initiates an approval workflow to determine whether the newly added component and/or dependency should be included in the software application, and sets an approval state for the new respective artifact based on a result of the approval workflow.

3. The system of claim 2, wherein based on the evaluation of at least one of the events, the policy-based event engine is configured to initiate at least one action of one of the plurality of development tools that is different from the development tool indicated by the event.

4. The system of claim 2, wherein the plurality of development tools is a build script, a test script, a binary repository and/or a source code repository.

5. The system of claim 2, wherein the component of the software application is an implementation component and/or a third-party component.

6. The system of claim 2, wherein the at least one action is a test procedure, a build process, a deployment process, closing a binary repository and/or closing a source code repository.

7. The system of claim 2, wherein if the approval workflow results in the new artifact being rejected, the policy-based event engine is configured to initiate an action of an existing development tool to remove the corresponding component and/or dependency from the software application.

8. The system of claim 2, wherein the at least one event reflects that a third-party component was added to the software application, and wherein the policy-based event engine is configured to determine whether the third-party component is compliant with the at least one policy.

9. The system of claim 2, further comprising at least one event generator for a corresponding existing development tool, wherein the at least one event generator is configured to create the at least one event and to send the at least one event to the event channel when the corresponding existing development tool performs an action.

10. The system of claim 9, wherein the at least one event generator provides a function that is callable by the corresponding development tool to create the at least one event.

11. The system of claim 10, wherein the at least one event generator is configured to scan a state of the corresponding development tool to create the at least one event.

12. The system of claim 9, wherein the at least one event generator is configured to scan a state of the corresponding development tool to create the at least one event.

13. The system of claim 2, wherein the at least one event is an XML-based event.

14. The system of claim 2, wherein each artifact stored in the repository includes an approval state indicating whether the component and/or the dependency associated with the respective artifact is approved or rejected for being included in the software application.

15. The system of claim 2, wherein when it is determined that the repository comprise the artifact that corresponds to the new component and/or dependency, determining whether the new component and/or dependency can be included in the software application based on information in the corresponding artifact.

16. The system of claim 2, wherein when it is determined that the artifact that corresponds to the new component and/or dependency is not approved to be included in the software application, the policy-based event engine is configured to initiate at least one action of one or more of the plurality of development tools to remove the new component and/or dependency from the software application.

17. A non-transitory computer readable storage medium tangibly storing a computer program, which upon execution by at least one processor, causing the computer to, at least, perform:

receiving from an event channel at least one event that indicates one or more actions performed by one of a plurality of existing development tools used in the development of the software application, at least one event reflecting that a new component and/or dependency between components of the software application was added to the software application;

evaluating with a policy-based event engine the at least one event and initiating with the policy-based event engine at least one action of one of the plurality of existing development tools indicated by the received event and in accordance with at least one policy;

storing in a repository a plurality of artifacts defining an architecture of the software application, wherein at least one artifact corresponds to a component of the software application and at least one artifact corresponds to a dependency between components of the software application, wherein artifacts stored in the repository include meta-data for the components and for dependencies between components of the software application;

determining with the policy-based event engine whether the repository comprises an artifact that corresponds to the new component and/or dependency reflected in the received event; and when it is determined that the repository does not comprise an artifact that corresponds to the new component and/or dependency, creating a new respective artifact corresponding to the newly added component and/or dependency for storage in the repository, initiating an approval workflow to determine whether the newly added component and/or dependency should be included in the software application, and setting an approval state for the new respective artifact based on a result of the approval workflow.

* * * * *